3,798,118
HOT MELT ADHESIVE FORMULATION
Faber B. Jones, Nowata, Okla., assignor to Phillips Petroleum Company, Bartlesville, Okla.
No Drawing. Continuation-in-part of application Ser. No. 100,294, Dec. 21, 1970, which is a continuation-in-part of application Ser. No. 614,413, Feb. 7, 1967, which in turn is a continuation-in-part of application Ser. No. 580,194, Sept. 19, 1966, all now abandoned. This application June 6, 1972, Ser. No. 260,214
Int. Cl. C08f 45/30, 45/52
U.S. Cl. 161—245                                10 Claims

ABSTRACT OF THE DISCLOSURE

Hot melt adhesive compositions with superior resistance to high temperature loss of strength are prepared from conventional ingredients including resin tackifiers and waxes plus a high melt flow resinous polymer of propylene The adhesive formulations can contain about 20 to 90 weight parts of substantially crystalline resinous propylene polymer which includes homopolymers of propylene, and copolymers of ethylene and propylene and 10 to 80 weight parts of resin tackifier and optionally a proportion of wax per 100 parts of total adhesive formulation. The compositions can be used as sealants or adhesives in producing laminates which can then be exposed to boiling water or steam without adhesive failure.

BACKGROUND OF INVENTION

This is a continuation-in-part application of my copending application having Ser. No. 100,294, filed Dec. 21, 1970, now abandoned, which is a continuation-in-part of Ser. No. 614,413, filed Feb. 7, 1967, now abandoned, which is a continuation-in-part of Ser. No. 580,194, filed Sept. 19, 1966, now abandoned.

This invention relates to novel hot melt adhesive compositions. In accordance with one aspect, this invention relates to hot melt adhesive compositions comprising high melt flow substantially crystalline resinous polymers of propylene and conventional resin tackifiers and optionally other adhesive additives. In accordance with another aspect, this invention relates to hot melt adhesives with superior resistance to loss of bonding strength at elevated temperatures, for example, up to about 150° C. and higher prepared from conventional ingredients plus resinous crystalline polypropylene or substantially crystalline resinous ethylene-propylene copolymers. In accordance with a further aspect, this invention relates to a hot melt adhesive prepared from conventional ingredients plus a substantially crystalline blend of resinous crystalline and resinous amorphous polypropylene.

One of the more significant developments in adhesive technology in recent years has occurred in the area of hot melt adhesives. Growth in the use of hot melt systems has been particularly marked by various segments of the packaging, book binding, and shoe industries, as well as in certain specialized areas of metal-to-metal bonding. Increased interest in hot melts has in turn encouraged development of special types of thermoplastic resins to serve as base constituents in commercial formulations.

The blending of various polymers to achieve a mutual modification of properties suitable for particular applications in the manufacture of plastic products is well known. Some of these blends are particularly designed to form adhesives or laminating agents which will form strong bonds between dissimilar materials such as wood-metal laminates or which will act as binders between layers of the same material not only as an adhesive but to impart tear resistance, strength, or other desirable quality to the resulting laminate.

Hot melt adhesive formulations based on a variety of polymers and copolymers have come into prominence in several recent developments generally based on polymers derived from ethylene such as ethylene-vinyl acetate copolymers. Some of these known formulations suffer from the disadvantage of having a very low softening temperature of the order of 80–90° C., i.e., below the boiling point of water.

Accordingly, I have now discovered useful hot melt adhesive formulations based on substantially crystalline resinous propylene polymers which have a softening point of about 150° C., which means that hot water immersion or wet steam contact with the laminated product will not destroy the laminate. A resinous polymer for the purpose of this disclosure is defined as a polymer having physical characteristics like a natural resin, i.e., those characteristics which are associated with plastics that are called synthetic resins.

Accordingly, an object of this invention is to provide a hot melt adhesive with superior resistance to high temperature loss of strength.

Another object of this invention is to provide hot melt adhesive compositions which possess outstanding characteristics of flexibility, tackiness and strength under widely varying conditions of temperature.

A further object of this invention is to provide hot melt adhesive compositions which are characterized by their ability to adhere to a wide variety of substrates.

A further object of this invention is to provide a method for bonding a variety of substrates to produce laminates and to provide laminates bonded with the adhesive composition of this invention.

Other aspects, objects, as well as the several advantages of this invention will be apparent to those skilled in the art upon reading the specification and the appended claims.

In accordance with the invention, hot melt adhesive compositions with superior resistance to high temperature loss of strength are prepared from conventional ingredients plus a high melt flow resinous polymer of propylene. I have found that the compositions of my invention can be heated to temperatures of the order of 145–150° C. without adhesive failure. Thus, I provide compositions which can be used as sealants or adhesives in materials exposed to boiling water or steam without adhesive failure, a distinct advantage in certain laminate applications.

The polymer of propylene employed in the invention is preferably a resinous high melt flow stereoregular propylene homopolymer, i.e., crystalline polypropylene, or a substantially crystalline resinous ethylene-propylene copolymer having an ethylene content of up to 50 weight percent and the remainder being propylene. It is within the scope of this invention to also employ substantially crystalline blends of resinous crystalline and amorphous polypropylene wherein the amount of amorphous polypropylene will range up to 90 weight percent based on the total weight of the blend of amorphous and crystalline polypropylene with a range of up to 70 percent by weight amorphous polypropylene being preferred. The limit of the amount of amorphous polypropylene in a blend with crystalline polypropylene is the amount which will still yield a blend with substantially resinous crystalline properties. Good results are obtained with using both blends of 67 percent amorphous and 33 percent crystalline polypropylene and 50–50 blends of amorphous and crystalline polymers.

The adhesive formulations according to the invention can contain about 20 to 90 weight parts of resinous propylene polymer which includes homopolymers of propylene, and copolymers of ethylene and propylene, as defined above, preferably 25 to 75 weight parts of the resinous propylene polymer per 100 parts of final adhesive formulation. Formulations containing 40 to 70 weight parts of the resinous propylene polymer per 100 parts of final adheivse formulation show even more improved properties. The crystalline polymers of propylene suitable for use in the adhesives of the invention should have a melt flow number (as determined by ASTM Method D1238–57T) ranging from 5 to 300 and in the broadest range up to 400 preferably from about 150 to about 300.

Resin tackifiers can be used alone or together with other known additives in the adhesive formulations of the invention. Suitable resin tackifiers that can be employed in the hot melt adhesive compositions of the invention include natural rosins, such as gum rosin, wood rosin, and tall oil rosin; hydrogenated rosins, such as hydrogenated wood, gum, and tall oil rosins; esters of rosins, such as the methyl and glycerol esters of wood rosin, gum rosin, or hydrogenated wood rosin; chlorinated biphenyl resins containing, say, from 32 to 65 percent chlorine; methylated paraffinic chain hydrocarbon resins; and terpene polymers having softening points ranging from 10° C. to 135° C. Resin tackifier can be advantageously added in amounts ranging from 10 to 80 parts per 100 parts of total adhesive formulation. A range from 25 to 75 parts per 100 parts of total adhesive formulation is particularly effective and a range of 30 to 40 parts rosin ester as resin tackifier per 100 parts total adhesive is, at present, most preferred with a range of total resin tackifier of 30 to 75 most preferred.

Optionally various miscellaneous additives or extenders can be incorporated in the adhesive formulations of the invention. Of particular utility in adjusting viscosity and hardness is the use of waxes or wax-like materials, including, for example, petroleum waxes, such as paraffin and microcrystalline wax, or synthetic waxes such as Fischer-Tropsch wax.

The adhesive formulation should contain a resin tackifier and optionally a wax in a concentration within the range of about 10 to 80 parts total by weight of resin tackifier and wax, if added, per 100 parts of total adhesive formulation. Thus, the resin tackifier can be used in the absence of wax or mixtures of the resin tackifier and wax can be employed in any proportion up to a maximum wax content of 50 weight percent of the tackifier-wax mixture. It is to be understood that mixtures of more than one resin tackifier can be employed and mixtures of more than one wax can optionally be added along with tackifier.

The adhesives of the invention can be prepared in conventional manner such as by mixing of the resinous polymer of propylene at temperatures above the melting points of the resin tackifier and optional additive components with agitation. One convenient method of preparing the adhesives of the invention comprises first melting about one-half of the tackifying resin at a temperature ranging from 200 to 400° F., and then adding the resinous polymer of propylene to the molten tackifier. The resulting mixture is blended until a smooth, homogeneous mass is obtained and the remainder of the formulation, i.e., the remainder of the tackifier, and other miscellaneous additives, when desired, are then added to the uniform mass. Thereafter the entire mixture can be blended until the mass is smooth and homogeneous. The hot melt adhesive composition can then be used directly in adhering one surface to another or it can be extruded into other forms for use in an appropriate hot melt applicator. It should be understood by those skilled in the art that the adhesives of this invention can be applied by any of the hot melt applicators commonly known in the art. Also, the compositions of the invention can be applied in any thickness the practitioner finds expedient.

Laminates made by the process of bonding one surface of a substrate with another surface of a substrate using the hot melt adhesive formulations described above as adhesive agent are not subject to bond destruction by contact with hot water or steam at temperatures below 150° C. Although laminates of paper substrates bonded with the adhesive formulation of this invention are probably of the greatest utility, other laminates containing substrates of wood or wood products, plastic materials, such as Mylar, polyolefin, polyurethane, etc.; foils of such metals as tin, aluminum, gold, silver, etc., bonded with substrates of the same or different materials are contemplated by this invention. The method of lamination is to apply the adhesive formulation in the molten state to at least one of the surfaces to be adhered and to maintain the surfaces in juxtaposition until a bond is secured by cooling.

Since the adhesive formulations described above are not subject to bond destruction by contact with hot water or steam at temperatures below 150° C. they serve as an effective sealant for substrates coated with the adhesives. Substrates that can be effectively sealed with these adhesives are any porous substrate particularly wood and wood products such as paper, and construction surfaces such as concrete, stone, brick and the like. The method of sealing is to apply the adhesive formulation heated to flowable consistency to the surface to be sealed and allowing the adhesive to cool. The adhesive formulations also can be employed as sealants or caulking agents to plug apertures such as cracks or crevices or join various like or unlike substrates, e.g., in or on buildings or other forms of construction for which sealants or caulking agents are applicable in closing leaks. For example, substrates such as wood, plastics, glass, stone such as granite, marble, or the like, brick, concrete, or metals such as aluminum, steel, iron, zinc, or the like can be joined.

EXAMPLE

Hot melt adhesive formulations were prepared as follows:

The rosin component and, where applicable, the wax component were melted in an open container, a beaker or evaporating dish, at 300–325° F., followed by gradual addition of the homopolymer or copolymer compositions being compared, with constant low shear agitation until a homogeneous, fluid melt was obtained. The time needed to prepare the formulation varied from 20 minutes to 1 hour, depending on the type of resin used.

Tests were conducted on all formulations to compare adhesive strengths, softening temperatures, and viscosities. The composition of the adhesive formulations and the results of these tests are summarized in Table I.

TABLE I

| Ingredient: | Formulations, parts by weight | | | | | | | | | |
|---|---|---|---|---|---|---|---|---|---|---|
| | A | B | C | D | E | F | G | H | I | J |
| Crystalline polypropylene a | 40 | 25 | | | 25 | 25 | | | | |
| Ethylene-propylene copolymer resin b | | | 40 | 25 | | | | | | |
| Amorphous polypropylene c | | | | | 25 | 50 | | | | |
| Ethylene-vinyl acetate copolymer d | | | | | | | 40 | | | |
| Polyethylene e | | | | | | | | 40 | | |
| Microcrystalline wax f | 30 | 37.5 | 30 | 37.5 | 25 | | 30 | 30 | | |
| Glycerol ester of hydrogenated rosin g | 30 | 37.5 | 30 | 37.5 | 25 | 25 | 30 | 30 | | |
| Hydrogenated rosin h | | | | | | | | | 43.5 | 28.5 |
| Ethylene-propylene copolymer rubber i | | | | | | 26.3 | | | | 9.5 |
| Polyethylene j | | | | | | | | | 104.0 | 142.8 |
| Fischer-Tropsch wax k | | | | | | 26.3 | | | | |
| Crystalline polypropylene l | | | | | | | | | | 19 |

See footnotes at end of table.

TABLE 1—Continued

| | Formulations, parts by weight | | | | | | | | | |
|---|---|---|---|---|---|---|---|---|---|---|
| | A | B | C | D | E | F | G | H | I | J |
| Melt viscosity at: | | | | | | | | | | |
| 150° C. M cps. [m] | 22 | 1.5 | 64 | 2.3 | 2 | 19.5 | 20 | 5.8 | | 35.2 |
| 165° C. M cps. [m] | 10 | 1.17 | 49 | 1.65 | 1.3 | 8 | 16.2 | 4.6 | 15.6 | |
| 180° C. M cps. [m] | 2 | 1 | 36.5 | 1.4 | 1.05 | 1.5 | 8.3 | 3.6 | | |
| Peel strength from substrates, p.p.i.w. [n]: | | | | | | | | | | |
| Paper to paper | 0.16 | 0.10 | PF | PF | PF | PF | PF | PF | | |
| Paper to Mylar | 0.10 | 0.01 | 2.50 | PF | 0.01 | PF | PF | 0.10 | | |
| Paper to foil | 0.04 | 0.06 | 0.58 | 0.25 | 0.35 | 0.60 | PF | 0.10 | | |
| Static load failure temp., ° C. [o] | 159 | 149 | 146 | 144 | 152 | 154 | 69 | 93 | 100 | 100 |
| Ball & ring softening point, ° C. [p] | 157 | 150 | 146 | 140 | 153 | 156 | 80 | 97 | 100 | 105 |

[a] Melt flow (ASTM D 1238–57T), approximately 300 g./10 min. at 230° C.; melting point, approximately 165° C.; density, 0.91 g./cc. at 23° C.; molecular weight, approximately 90,000.
[b] Melt flow (ASTM D 1238–57T), approximately 190 g./10 min. at 230° C.; ethylene content, approximately 25 weight percent. Copending application Serial No. 432,857, filed February 15, 1965, characterizes such polymers and describes method of preparing same.
[c] Obtained as a pentane-soluble extract from a propylene polymer prepared in the presence of an organo-metal catalyst system and washed with sulfuric acid and water to remove catalyst residues, followed by vacuum drying. The material was a medium brown tacky semi-solid with a pour point of 104° F.
[d] Elvax 250 copolymer. Vinyl acetate content, approximately 28 weight percent; melt index (ASTM D 1238–57T), approximately 15 g./10 min. at 190° C. softening point (ring and ball method) (ASTM D 36–62T), 280° F.; density, 0.951 g./cc. at 23° C.
[e] Marlex (a trademark) TR–870 polyethylene. Density, 0.917 g./cc. at 23° C.; melt index (ASTM D 1238–57T), 70 g./10 min. at 190° C.; tensile strength (ASTM D 638–61T), 1,000 p.s.i.; Vicat softening temperature (ASTM D 1525–58T), 183° F.; brittleness temperature (ASTM D 746–57T), −26° F.; Shore D hardness (ASTM D 1706–61, Shore durometer, Type D), 45.
[f] Mobil 2305 microcrystalline wax.
[g] Staybelite Ester 10 resin.
[h] Staybelite resin.
[i] Ethylene content, 44.7 weight percent; Mooney viscosity (ASTM D 1646–63), 37.
[j] Epolene C–10 wax grade polyethylene.
[k] Paraflint RG wax.
[l] Melt flow (ASTM D 1238–57T), 186 g./10 min. at 230° C.; melting point, approximately 162° C.; density, 0.91 g./cc. at 23° C.
[m] Brookfield Viscosimeter, Model RVF.
[n] ASTM D 1876–61T; p.p.i.w. denotes peel strength in pounds per inch width of sample; PF denotes bond failure by fiber tear at the paper surface.
[o] Temperature of failure under static load of 250 grams on 1″ × 1″ square bonded area loaded in shear.
[p] ASTM D 36–62T.

In formulations A and B, the propylene polymer component was high melt flow resinous crystalline polypropylene. This material was compatible in the melt with the other two conventional ingredients of the formulations, and furthermore the compositions exhibited melt viscosities in the temperature range of 150–180° C. which could be machined on present hot melt applicator equipment. The temperature resistance of formulations A and B showed considerable improvement over the four control formulations G, H, I and J with an increase of up to 77° C. in softening point (ball and ring) and up to 90° C. in static load failure temperature.

The influence of introducing ethylene as a commonomer in a stereoregulating propylene polymerization system in regard to hot melt adhesive characteristics containing resinous ethylene-propylene copolymer can be seen in formulations C and D. The amount of ethylene incorporated in the high melt flow copolymer used was sufficient to cause an increased melt compatibility of the base resin with the wax and rosin ester co-ingredients as reflected by the increased melt viscosities at both concentrations. The desired increase in temperature resistance in formulation C was obtained to nearly the same extent as in the case of the compositions containing resinous crystalline polypropylene, by both the softening point and static shear load test. Also of significance was the improvement in peel strength properties for the formulations of resinous ethylene-propylene copolymer over those containing the resinous propylene homopolymer, which reflects greater toughness. At both the 40 and 25 p.p.h. resin level, the peel strengths of the copolymer based compositions were superior to those for the polyethylene based control (formulation H).

Formulations E and F illustrate the effects of using amorphous polypropylene at two different levels in conjunction with high melt flow resinous crystalline polypropylene. These two compositions displayed good melt compatibility, and melt viscosities of both were within acceptable limits at temperatures of 150 to 180° C. Again, a substantial increase in temperature resistance over the four control compositions G, H, I and J was evidenced. Peel strength characteristics on the whole were superior to the polyethylene based control (formulation H), and formulation F was roughly equivalent to the ethylene-vinyl acetate copolymer based control, showing slightly lower values on only the paper to foil lamination, which is a particularly difficult combination for this type of adhesive. It will be observed that formulation F contained a rosin, but not microcrystalline wax, yet an adhesive having a good balance of properties was obtained.

Reasonable variation and modification are possible within the scope of the foregoing disclosure and the appended claims to the invention, the essence of which is that hot melt adhesive with superior resistance to loss of bond strength at high temperature (to about 150° C.) are prepared from conventional ingredients plus a resinous high melt flow polymer of propylene, including resinous copolymers of ethylene and propylene.

I claim:

1. A method for adhering a surface of one substrate to a surface of another substrate to produce a laminate of distinct substrates wherein
    (1) a hot melt adhesive composition consisting of a homogeneous mixture of 25 to 75 weight parts per hundred parts adhesive of
        (a) a substantially crystalline resinous high melt flow polymer of propylene having a melt flow number in the range of 5–400 (as determined by ASTM Method D1238–57T) selected from the group consisting of crystalline polypropylene and substantially crystalline blends of resinous crystalline and amorphous polypropylene wherein the amount of amorphous polypropylene ranges up to 70 weight percent based on the total amount of the blend of amorphous and crystalline polypropylenes and 75–25 weight parts per hundred weight parts of adhesive of
        (b) at least one resin tackifier selected from the group consisting of natural rosins, hydrogenated rosins, rosin esters, and chlorinated biphenyl resins containing from 32–65 percent chlorine is applied in the molten state to at least one of the surfaces, and
    (2) the surfaces are maintained in juxtaposition until the bond is secured.

2. The method of claim 1 wherein (a) is a resinous crystalline polypropylene and (b) is a rosin ester.

3. The method of claim 1 wherein (a) is a blend of resinous crystalline and amorphous polypropylene and (b) is a rosin ester.

4. The method according to claim 2 wherein in addition to said polymer of propylene and said rosin tackifier the adhesive contains a microcrystalline wax in an amount in the range of up to 50 percent by weight of the total non-propylene polymer content of the composition.

5. The method according to claim 3 wherein in addition to said mixture of resinous crystalline and amorphous polypropylene and said rosin ester the adhesive contains a microcrystalline wax in an amount in the range of up to 50 percent by weight of the total non-propylene polymer content of the composition.

6. A laminate comprising two or more distinct substrates adhered together with an adhering composition comprising a hot melt adhesive composition consisting of a homogeneous mixture of 25–75 weight parts per hundred parts adhesive of
   (a) a substantially crystalline resinous high melt flow polymer of propylene having a melt flow number in range of 5–400 (as determined by ASTM Method D1238–57T) selected from the group consisting of crystalline polypropylene and substantially crystalline blends of resinous crystalline and amorphous polypropylene wherein the amount of amorphous polypropylene ranges up to 70 weight percent based on the total amount of the blend of amorphous and crystalline polypropylenes and 75–25 weight parts per hundred weight parts of adhesive of
   (b) at least one resin tackifier selected from the group consisting of natural rosins, hydrogenated rosins, esters, and chlorinated biphenyl resins containing from 32–65 percent chlorine.

7. A laminate according to claim 6 wherein (a) is a resinous crystalline polypropylene and (b) is a rosin ester.

8. A laminate according to claim 6 wherein (a) is a blend of resinous crystalline and amorphous polypropylene and (b) is a rosin ester.

9. A laminate according to claim 7 wherein in addition to said polymer of propylene and said resin tackifier the adhesive contains a microcrystalline wax in an amount in the range of up to 50 percent by weight of the total non-propylene polymer content of the composition.

10. A laminate according to claim 8 wherein in addition to said mixture of resinous crystalline and amorphous polypropylene and said rosin ester the adhesive contains a microcrystalline wax in an amount in the range of up to 50 percent by weight of the total non-propylene polymer content of the composition.

References Cited
UNITED STATES PATENTS

| | | | |
|---|---|---|---|
| 3,220,966 | 11/1965 | Flanagan | 260—27 |
| 3,313,754 | 4/1967 | Logan | 260—27 |
| 3,463,752 | 8/1969 | Bornstein | 260—27 |
| 3,705,123 | 12/1972 | Mahlman | 260—28.5 A |
| 3,664,981 | 5/1972 | Mahlman | 260—27 |
| 3,376,244 | 4/1968 | Rundle | 260—28.5 |

ALLAN LIEBERMAN, Primary Examiner

P. R. MICHL, Assistant Examiner

U.S. Cl. X.R.

156—334; 260—27 R, 28.5 A, 33.8 GA